United States Patent [19]
Weiss

[11] Patent Number: 5,865,225
[45] Date of Patent: Feb. 2, 1999

[54] ROTATING DEVICE FOR FILLING LIQUIDS IN PORTIONS INTO BOTTLES, CANS OR SIMILAR RECEPTACLES

[75] Inventor: Wilhelm Weiss, Lappersdorf, Germany

[73] Assignee: Krones AG Hermann Kronseder Maschinenfabrik, Neutraubling, Germany

[21] Appl. No.: 959,281

[22] Filed: Oct. 24, 1997

Related U.S. Application Data

[63] Continuation of Ser. No. 532,699, filed as PCT/EP94/01116, Apr. 11, 1994.

[30]    Foreign Application Priority Data

| Apr. 16, 1993 | [DE] | Germany | 43 12 367.8 |
| May 18, 1993 | [DE] | Germany | 43 16 516.8 |
| May 28, 1993 | [DE] | Germany | 43 17 865.0 |
| Jul. 23, 1993 | [DE] | Germany | 43 24 799.7 |
| Sep. 17, 1993 | [DE] | Germany | 43 31 624.7 |

[51] Int. Cl.$^6$ .............................. B67C 3/20; G01F 11/28; G01F 11/32
[52] U.S. Cl. .......................... 141/198; 141/101; 141/145
[58] Field of Search ................................ 141/9, 100, 101, 141/104–106, 135, 144–146, 198

[56]    References Cited

U.S. PATENT DOCUMENTS

| 2,043,578 | 6/1936 | Markus | 141/146 X |
| 2,462,019 | 2/1949 | Bowman | 141/104 |
| 2,466,731 | 4/1949 | Nordquist | 141/146 X |
| 2,871,892 | 2/1959 | Jessel | 141/100 |
| 3,180,375 | 4/1965 | Fechheimer . | |
| 3,311,141 | 3/1967 | Bell | 141/244 |
| 3,464,464 | 9/1969 | Laub | 141/145 X |
| 4,522,238 | 6/1985 | Minard | 141/144 X |
| 4,958,665 | 9/1990 | Iwano | 141/95 |
| 4,966,205 | 10/1990 | Tanaka | 141/9 |
| 5,150,743 | 9/1992 | Walusiak | 141/144 X |
| 5,184,573 | 2/1993 | Stevens, Jr. . | |

FOREIGN PATENT DOCUMENTS

| 0123512 | 10/1981 | European Pat. Off. . |
| 0106971 | 5/1984 | European Pat. Off. . |
| 0134052 | 3/1985 | European Pat. Off. . |
| 0262258 | 4/1988 | European Pat. Off. . |
| 0414075 | 2/1991 | European Pat. Off. . |
| 0470398 | 2/1992 | European Pat. Off. . |
| 2018658 | 6/1970 | France . |
| 1595492 | 7/1970 | France . |
| 2387438 | 11/1978 | France . |
| GM 1894 920 | 6/1964 | Germany . |
| AS 1204 961 | 11/1965 | Germany . |
| OS 20 03216 | 7/1971 | Germany . |
| 3006995 | 9/1981 | Germany . |
| 3416127 | 10/1985 | Germany . |
| 4005000 | 8/1991 | Germany . |
| 282679 | 12/1970 | Russian Federation . |
| 932242 | 5/1982 | Russian Federation . |
| 173029 | 4/1992 | Russian Federation . |
| 267718 | 2/1942 | Switzerland . |

*Primary Examiner*—J. Casimer Jacyna
*Attorney, Agent, or Firm*—Tilton, Fallon, Lungmus & Chestnut

[57]    ABSTRACT

In a device used for filling liquids in portions into bottles, cans or similar receptacles and having a plurality of volumetric dosing chambers, which are arranged on a rotor and which are connected to a storage reservoir for the liquid via a controllable inlet valve and to a filler neck via a controllable outlet valve, at least two sensors responding to different filling levels are arranged in each dosing chamber, the sensor arranged on a higher level closing the inlet valve when the filling level has risen to a specific height, and the sensor arranged on a lower level closing the outlet valve when the filling level has dropped to a specific height. The volume of one portion of the liquid to be canned or bottled is thus defined in a simple manner by the vertical distance between the two sensors, or rather the measuring points of said sensors.

60 Claims, 9 Drawing Sheets

ROTATING DEVICE FOR FILLING LIQUIDS IN PORTIONS INTO BOTTLES, CANS OR SIMILAR RECEPTACLES

This application is a continuation of application Ser. No. 08/532,699, filed as PCT/EP94/01116, Apr. 11, 1994.

DESCRIPTION

The present invention relates to a rotating device for filling liquids in portions into bottles, cans or similar receptacles according to the generic clause of claim 1.

Different structural designs of such devices are known:

In the device according to French patent specification 1 595 492, each vertical dosing chamber has arranged therein a freely movable piston, which is connected via a thin line to the gas cushion in the storage reservoir for the liquid. In the open condition of the inlet valve, the liquid flows from the storage reservoir, which is arranged on a higher level, into the dosing chamber while lifting the piston and continues to rise in the line until the height of the filling level in the storage reservoir is reached. In view of the fact that the liquid level in the dosing chambers is always covered by the pistons, inclined positions of the liquid level which would deteriorate the filling accuracy and other deformations of the liquid level caused by the rotational movement of the dosing chambers together with the rotor are avoided from the very beginning. Inaccuracies, however, result from the liquid volume in the flexible lines, which, in turn, depends on the filling level in the storage reservoir.

In the device according to German-Offenlegungsschrift 30 06 995, an adjustable displacer, by means of which the dosing chamber volume can be varied, projects into each of the pistonless dosing chambers. The upper end of each dosing chamber has connected thereto a rigid line, which projects into the gas-containing space of the storage reservoir for the liquid and which is filled up to the height of the filling level in the storage reservoir when the inlet valve is open. Although deformations of the liquid level may here occur when the dosing chambers are being filled, these deformations do not have any disadvantageous effects because the dosing chambers are filled completely or rather overfilled. However, also in the case of this device inaccuracies occur in response to variations of the filling level in the storage reservoir, said filling level being additionally influenced by the rotational movement of the liquid together with the storage reservoir.

The known rotating devices for filling liquids in portions into receptacles according to the generic clause have a complicated structural design, and it is difficult to clean them and to change them over to other quantities of the portions to be canned or bottled.

These disadvantages are to be eliminated by the present invention.

Depending on the nature of the liquid to be canned or bottled and the high measuring accuracy demanded in spite of the rotational movement of the dosing chambers, various possibilities exist with regard to the structural design and the arrangement of the sensors. Some of these possibilities are disclosed in claims 2 to 12 and 24 to 34. When the structural design of the sensors according to claims 24 to 34 is used, a continuous, exact supervision of the filling level can be carried out in the area of the measurement zone. Within the measurement zone, the switching point for the inlet valve and/or the outlet valve can be adjusted at will, e.g. with the aid of a predetermined, variable threshold value with which the measuring signal is compared. Hence, a mechanical adjustment of the sensor is not necessary upon changing the dosing volume. The sensor preferably produces an electrical measuring signal, which can be processed in a particularly simple manner. The structural design as a float-type probe having a guide rod, which is used for guiding the annular float and which is arranged concentrically with the central axis of the dosing chamber, according to claims 29 to 32 additionally shows the advantage of a particularly high insusceptibility to movements of the liquid level. Hence, a very high filling accuracy is possible in spite of the rotational movement of the dosing chambers, said filling accuracy being also achieved during the acceleration or the deceleration of the rotor. Also the measure according to claim 38 contributes to this filling accuracy, said measure resulting in a particular slender structural design of the dosing chamber with a small surface of the liquid. The internal diameter of the dosing chamber preferably amounts to 50 to 70 millimeters, the height being approx. 600 mm.

There are also various possibilities for controlling the filling operation with the aid of the sensor or sensors. Some of these possibilities are disclosed in claims 6 to 9. Particularly advantageous is the embodiment according to claims 8 and 9, in the case of which a certain residual amount of liquid always remains in the lower area of the dosing chamber up to the outlet valve. In comparison with complete emptying of the dosing chamber, this solution provides enormous advantages, in particular at the beginning of the flow of liquid into the dosing chamber and at the end of the discharge of liquid into the receptacle to be filled. In addition, the ambient air is prevented from penetrating into the device.

According to a preferred embodiment of the invention disclosed in claims 35 to 39, the volume, especially the height of the dosing chamber, essentially exceeds the height required for the volume of any one portion of the liquid to be canned or bottled. The height position of the volume to be canned or bottled determines the geodetic height difference to the filler neck and, consequently, it determines the flow velocity in the filler neck and, in the final analysis, the filling performance to a decisive extent. For example, if the liquids in question are delicate liquids or liquids which tend to foam heavily, the volume to be canned or bottled can be placed in the lower area of the dosing chamber, whereby low flow velocities will occur, and little foam will, consequently, be developed, i.e. a gentle filling operation will be obtained. If the liquids in question are, however, less delicate, the volume to be canned or bottled can be placed in the upper area of the dosing chamber, whereby high flow velocities and, consequently, a high filling performance will be possible.

A device according to the further developments of the invention disclosed in claims 40 to 46 can be used for filling several different liquids, e.g. syrup on the one hand and mineral water on other other, into a bottle or the like. Due to the fact that the additional storage reservoir is also connected to the dosing chamber, said dosing chamber simultaneously acts as a mixing receptacle. Hence, good mixing will already be obtained while the various components are filled into the dosing chamber and discharged therefrom. The term liquid used in the sense of the present invention also includes viscous media and even media having a pulpy consistency, which may also contain small solid bodies, such as pieces of fruit. The device according to the present invention permits a completely new type of production of beverages, foodstuffs or the like, the various components being combined and mixed only a short time before they are filled into the vessel in question.

A device according to the further developments of the invention disclosed in claims 47 to 62 can be operated as pure volume filler and as pure height filler. In addition, various combinations between volume and height filling are possible. It follows that the device can cope with practically all imaginable cases of use occurring when receptacles are to be filled and, in addition, it permits completely new filling methods.

In the case of the further development of the present invention disclosed in claim 63, where a plurality of dosing chambers is provided for each filler neck, a simple change of the filling volume is possible by selectively activating one or more dosing chambers in addition. Furthermore, larger filling volumes with a higher performance can be realized, since, while emptying the first dosing chamber in a bottle or the like, the second dosing chamber can be filled and then be emptied into the bottle. The angle of rotation of the rotor, which is only required for filling the dosing chambers, is thus essentially reduced.

In the following, nine embodiments of the present invention will be described on the basis of the drawings, in which FIG. 1 is a front sectional view of a device for canning liquid according to the present invention;

Figure 1:
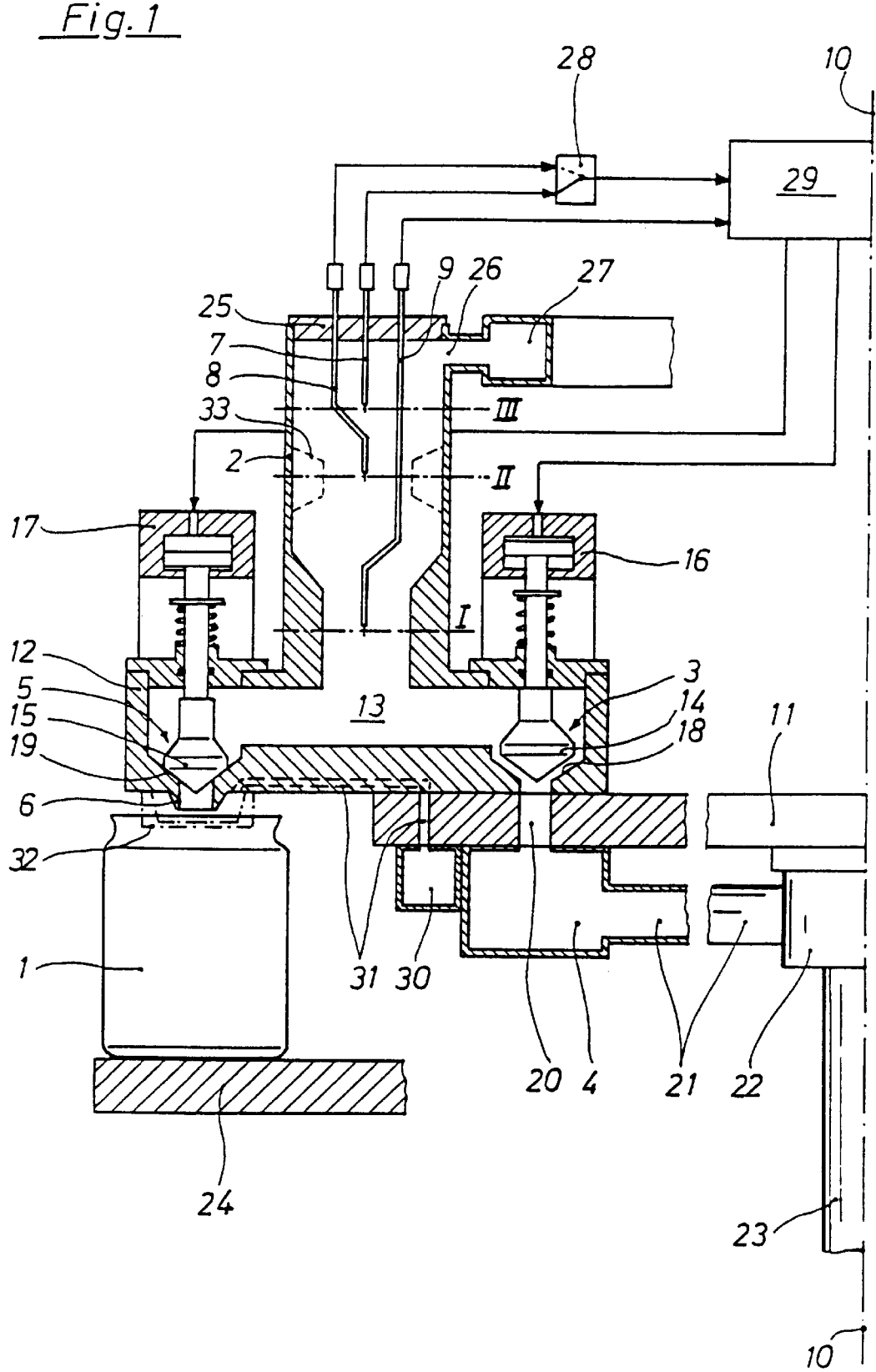

The device according to FIG. 1 is constructed such that it is adapted to fill a beverage in portions into continuously moving canshaped receptacles 1 under atmospheric pressure. Said device includes a rotor 11 in the form of a circular disc which rotates about a vertical axis of rotation 10. The circumference of the rotor 11 has secured thereto a plurality of valve blocks 12 including a cavity 13 which extends essentially in the radial direction, said valve blocks 12 being distributed evenly over the circumference of said rotor 11. An inlet valve 3 is provided at the inner end of said cavity and an outlet valve 5 is provided at the outer end thereof. Each of said valves is provided with a vertically movable valve body 14, 15, which can be raised or lowered by separate motor operators 16, 17 in the form of a pneumatic cylinder. The valve bodies 14, 15 cooperate with valve seats 18, 19, which conically taper downwards and which are provided in the valve block 12, said valve bodies 14, 15 extending sealingly out of the valve block 12. The valve seat 18 of the inlet valve 3 is followed by a short passage 20 which leads into an annular storage reservoir 4 for the liquid to be canned. This storage reservoir 4 has the beverage supplied thereto via a plurality of radial lines 21, a rotary distributor 22 arranged concentrically with the axis of rotation 10, and a riser 23. The beverage is supplied either via a pump (not shown) and a conventional pressure control, or via a stationary preceding tank (not shown) which is arranged on a higher level than the valve block 12.

The valve seat 19 of the outlet valve 5 is followed by a filler neck 6 in the form of a short tubular projection. This filler neck ends in spaced relationship with the upper edge of a receptacle 1 to be filled so that said receptacle 1 can be supplied unhindered to a rotary table 24, which rotates together with the rotor 11 and which will move said receptacle 1 together with the associated valve block 12 on a circular arc path.

A cylindrical dosing chamber 2 having a vertical central axis is arranged on the upper side of the valve block 12 centrally between the two motor operators 16, 17 projecting upwards. This dosing chamber 2 has a lower in- and outlet, which is reduced in diameter and which projects directly into the cavity 13 at a location between the outlet valve 5 and the inlet valve 3. The dosing chamber 2 essentially consists of a tubular metal vessel and the upper side thereof is sealingly closed by a cover 25. Below said cover 25, the dosing chamber 2 has a lateral vent 26 communicating with a ring passage 27 which is secured to the rotor 11. During the normal filling operation, the ring passage 27 communicates with the atmosphere via a reversing valve (not shown) so that the dosing chamber 2 can fill and empty unhindered.

In the cover 25, three sensors 7, 8, 9 in the form of electrical rod-type probes are secured in position, said sensors 7, 8, 9 supervising the filling level in the dosing chamber 2 and projecting essentially vertically into the interior of the dosing chamber 2. Each sensor 7, 8, 9 consists of an insulated metal wire, which is stripped at the lowermost tip thereof. The first sensor 7 is centrally positioned in the interior of the dosing chamber 2 and defines with its measuring point the highest filling level III which reaches up to a point slightly below the lateral vent 26. Accordingly, the whole volume of the dosing chamber 2 is larger than the maximum liquid volume of one portion which has to be canned. The second sensor 8 extends partially at the side of said first sensor 7, and, below said sensor 7, it is bent inwards towards the central axis of the dosing chamber 2. The measuring point of said second sensor 8 defines a lower filling level II. Finally, the third sensor 9 first extends at the side of the two first-mentioned sensors 7, 8, whereas the end of said third sensor is bent towards the central axis of said dosing chamber 2. This sensor 9 ends in the reduced-diameter in- and outlet area of the dosing chamber 2 and defines the lowest filling level I. Due to the fact that the measuring points of all three sensors 7, 8, 9 are located on the central axis of the dosing chamber 2, a uniformly high measuring accuracy will be obtained, unimpaired by possible inclined positions of the liquid level caused by the rotation with the rotor 11. The two upper sensors 7, 8 are connected to an electronic control means 29 via a selector switch 28, said control means 29 being secured to the rotor 11 and also having connected thereto the sensors of all the other dosing chambers 2. The liquid volume to be canned can be changed over in a very simple manner by means of the selector switch 28. This liquid volume is defined by the volume of the dosing chamber 2 between the lowest filling level I and the upper filling level II or III of the respective sensor 7 or 8 switched on.

Controlled by the control means 29, the following sequence of operations takes place in the device described hereinbefore: When the device starts to operate and prior to each filling process, the inlet valve 3 will be opened by lifting the valve body 14 from the valve seat 18 by means of the motor operator 16 (cf. FIG. 1). Under the pressure of the pump (not shown) or of the preceding tank (not shown), the liquid flows into the dosing chamber 2 from below via the riser 23, the rotary distributor 22, the lines 21, the annular storage reservoir 4, the passage 20 and the cavity 13, the air displaced by said liquid escaping through the opening 26. If the upper sensor 7 is switched on, the liquid will flow in until it reaches the highest filling level III and contacts the measuring point of said sensor 7. This will use electric current to flow from the live sensor 7 through the liquid to the metallic dosing chamber 2 which is connected to ground. This electric signal is detected by the control means 29, which will cause immediate closing of the inlet valve 3 by lowering the valve body 14. During the above-described filling of the dosing chamber 2, the outlet valve 5 is constantly closed.

If a sensor (not shown) now indicates that an empty receptacle 1 is positioned below the filler neck 6, the control means 29 will cause the outlet valve 5 to open by lifting the valve body 15 by means of the motor operator 17. The inlet valve 3 remains closed. The liquid will then flow from the dosing chamber 2 via the cavity 13 and the filler neck 6 into the receptacle 1 under geodetic pressure alone, until the lowest filling level I has been reached, whereupon the flow of current between the lower sensor 9 and the dosing chamber 2 will be interrupted. This signal is detected by the control means 29, and said control means will cause immediate closing of the outlet valve 5 by lowering the valve body 15 by means of the motor operator 17. The whole cavity 13 and the lower area of the dosing chamber 2 up to the filling level I remain thus always filled with liquid. On the other hand, the receptacle 1 has been filled precisely with the defined volume between the lower filling level I and the highest filling level III. The residual pressure of the remaining liquid column guarantees that defined flow conditions exist also at the end of the filling process and that foaming up of the liquid, which may perhaps occur, is avoided. Immediately after the closing of the outlet valve 5, the dosing chamber 2 can again be filled with liquid up to the highest filling level III in the manner described hereinbefore by controlled opening of the inlet valve 3. In view of the fact that the dosing chamber 2 is already filled in the lower area thereof, foaming up or whirling of the liquid will also be avoided when the refilling process is started.

The filling process takes place in a corresponding manner, when the middle sensor 8, instead of the upper sensor 7, is switched on by the selector switch 28. In this case, the dosing chamber 2 will be filled up to the middle filling level II during each refilling process, and the defined volume between the lowest filling level I and the middle filling level II flows into each receptacle 1.

In order to permit the whole device to be cleaned in circulation, the ring passage 27 is adapted to be connected via the reversing valve (not shown) to a conventional CIP (cleaning in process) system, and the riser 23 will have to be connected to said CIP system as well. In the open condition of the inlet valve 3, the whole device including the dosing chamber 2 can then be flushed with a liquid cleansing agent. The rotor 11 has secured thereto an additional ring passage 30 so that also the filler neck 6 as well as the valve seat 19 and the valve cone 15 of the outlet valve 5 can completely be included in the cleaning circuit, said ring passage 30 being adapted to be connected to the CIP system via lines, rotary distributors, reversing valves, etc., which are not shown. The ring passage 30 has connected thereto passages 31, which pass through the respective valve block 12 and which, close to the filler neck 6, open into the open air at the lower side of said valve block. When a flushing cap 32, which surrounds the filler neck 6 and the outlet opening of passage 31 in spaced relationship therewith, is secured to the lower side of the valve block 12 such that no liquid can escape, the cleansing fluid discharged from the filler neck 6 in the open condition of the outlet valve 5 can be collected in the ring passage 30 and thus be held in the system.

In order to improve the volumetric dosing accuracy making use of very simple sensors, the dosing chamber 2 can be provided with ringlike constrictions or reductions of cross-sectional area 33 in the area of the measuring points of the sensors, as indicated by the broken line in FIG. 1 in the area of the measuring point of the medium sensor 8.

Instead of single sensors 7, 8, 9 for the various filling levels I, II, III, it is also possible to use only one sensor having a plurality of measuring points or one sensor having an elongate measuring area, a simple stepwise or continuous adjustment of the desired filling levels being possible with the aid of electric switching devices. In addition, the sensors can be arranged such that they are vertically adjustable in the dosing chambers 2 of the device separately or in common, and this has again the effect that the dosing volume can easily be adjusted. An important point is that the predetermined filling levels are below the maximum possible filling level in the dosing chamber 2 in any case, said maximum possible filling level being defined by the lower edge of the vent 26. Liquid losses through this opening will thus be avoided.

Figure 2:
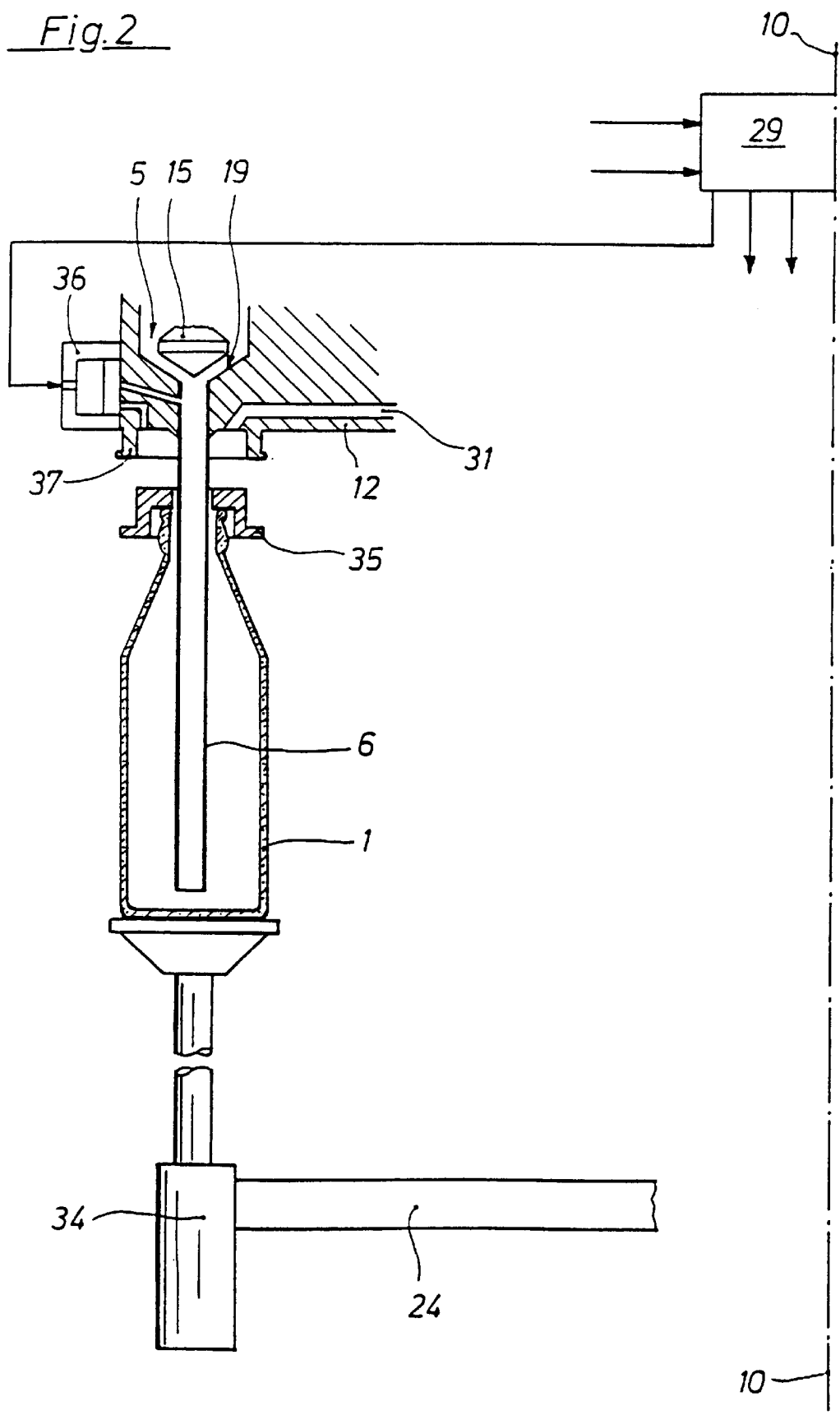
FIG. 2 is a front sectional view of a device for bottling liquid according to the present invention, with several parts removed for clarity.

The device according to FIG. 2 differs from the device according to FIG. 1 insofar as the filler neck 6 consists of a long filling pipe. It is thus possible to fill receptacles 1 in the form of bottles from below. Accordingly, the rotary table 24 is equipped with lifting mechanisms 34 by means of which the receptacles 1 are raised above the filler necks 6. The mouth of the receptacle is guided accurately by vertically movable centering bells 35 in the usual way. At the uppermost position of the lifting mechanisms 34 and of the receptacles 1, respectively, an annular gap remains between the lower side of the valve block 12 and the centering bell 35; the air displaced from the receptacles 1 while the liquid is flowing into said receptacles can escape through said annular gap. On the lower side of the valve block 12, a ringlike projection 37 is formed, which serves to hold the flushing bells (not shown). In addition, a pneumatic valve 36, which is adapted to be actuated by the control unit 29, is arranged on the lateral surface of the valve block 12; channels provided in the valve block 12 connect said pneumatic valve 36 to the filler neck 6 a short distance below the valve seat 19 on the one hand and to the atmosphere on the other. When the pneumatic valve 36, which is normally closed, is opened briefly by the control means 29 at the end of a filling process, the liquid contained in the filler neck 6 can flow into the receptacle 1 in the closed condition of the outlet valve 5.

Figure 3:
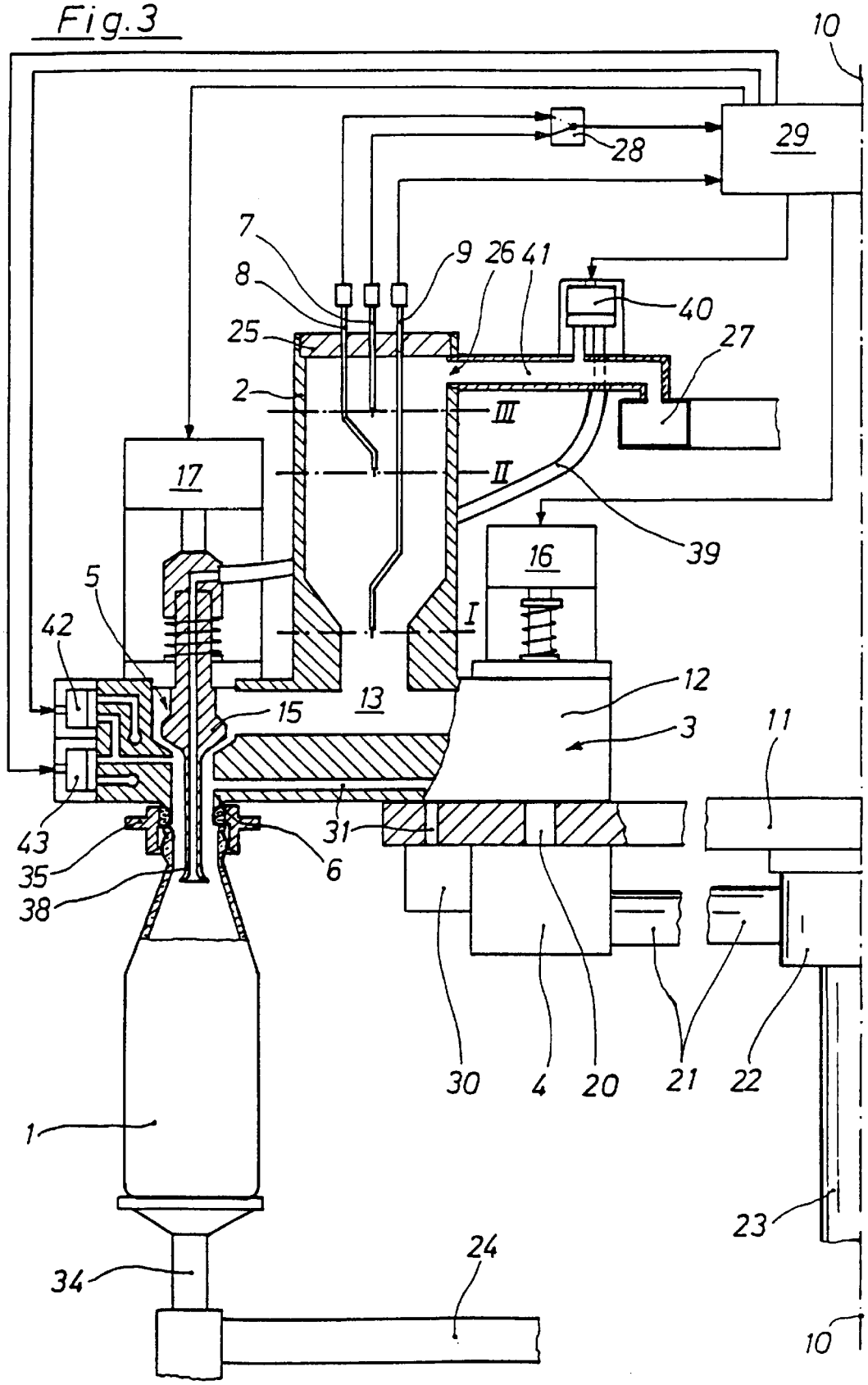
FIG. 3 is a front sectional view of an alternate embodiment of a device for bottling liquid according to the present invention.

Whereas the devices according to FIG. 1 and 2 are adapted to be used for filling processes under atmospheric pressure, the device according to FIG. 3 works with a counterpressure above atmospheric pressure, as should be done when beverages containing $CO_2$ are bottled. The device according to FIG. 3 corresponds to the device according to FIG. 1 especially with regard to the structural design of the dosing chamber 2 containing the three sensors 7, 8, 9, the inlet valve 3 and the supply of liquid to be bottled. Hence, only the deviating features will be described hereinbelow.

The valve body 15 of the outlet valve 5 has a central longitudinal hole and the lower end thereof is provided with a tubular extension 38. This tubular extension 38 projects slightly beyond the short filler neck 6 at the lower end thereof, and the end of said extension 38 is provided with a conical rejector for the liquid. The extension 38, which acts as a reflux gas tube, is connected to a pneumatic control valve 40 via the hole in the valve body and a flexible line 39 connected to the upper end of said hole. Said control valve 40 is, on the other hand, connected to the connection passage 41 between the opening 26 at the upper end of the dosing chamber 2 and the ring passage 27. The ring passage 27 is filled with pressurizing gas having a pressure above atmospheric. The supply and the control of the pressurizing gas is effected in the usual way via lines, rotary distributors, control valves and the like, which are not shown. The control valve 40 is actuated by the common electronic control means 29. In the open condition of said control valve 40, the extension 38 communicates with the pressurizing gas ring passage 27. Depending on the liquid to be bottled, the pressurizing gas used is, e.g., $CO_2$, air or a mixture of these two gases.

On the outer side of the valve block 12, two additional pneumatic control valves 42 and 43 are arranged, which are again actuated by the common electronic control means 29. These two control valves 42, 43 are connected to the filler neck 6 via a branched passage. In addition, one of the two control valves is connected to the atmosphere via a throttle nozzle, and the other control valve is connected to a ring passage containing pure $CO_2$. The respective connections and passages are not shown.

When the device according to FIG. 3 is in operation, the dosing chamber 2, which is constructed as a pressure vessel, is continuously filled with pressurizing gas via the ring passage 27, the connection passage 41 and the opening 26. The pressure of said pressurizing gas is slightly less high than the pressure of the liquid in the storage reservoir 4 so that the liquid can flow into the dosing chamber 2 when the inlet valve 3 is open. As for the rest, the alternate filling and emptying of the dosing chamber 2, which is controlled by the sensors 7, 8, 9, takes place in the same way as in the case of the device according to FIG. 1, the pressurizing gas cushion above the filling level increasing and decreasing in size accordingly.

Prior to the filling operation, the bottle-shaped receptacle 1—guided by the vertically movable centering bell 35—is pushed onto the extension 38 by means of the lifting mechanism 34, whereupon it is firmly pressed against the filler neck 6 so that said bottle-shaped receptacle 1 will be connected to said filler neck such that neither any liquid nor any gas can escape. Triggered by the control means 29, the control valve 40 will then be opened, whereupon pressurizing gas will flow from the ring passage 27 via the flexible line 39 and the extension 38 into the receptacle 1 until pressure compensation has been effected between the receptacle 1 and the ring passage 27 as well as the dosing chamber 2. Only then will the outlet valve 5 be forcibly opened by the control means 29, or it will open automatically by means of a spring, as is normally done in the case of counterpressure filling machines. While the liquid is flowing into the receptacle 1, the pressurizing gas flows out of the receptacle 1 through the extension 38 and back into the dosing chamber 2 and the ring passage 27, respectively. After sensor-controlled emptying of the dosing chamber 2 into the receptacle 1 via the filler neck 6, the outlet valve 5 is forcibly closed. Following this, the receptacle is connected to the atmosphere via one of the two control valves 42, 43 and via the throttle nozzle so that the pressure can decrease gradually. Subsequently, the filled and pressure-relieved receptacle 1 will be removed from the filler neck 6 and the extension 38 by lowering the lifting mechanism 34.

In order to permit low-oxygen bottling, the interior of the receptacle 1 can be flushed with pure $CO_2$ with the aid of the other control valve 42, 43 prior to introducing the pressurizing gas via the extension 38 and the control valve 40, said flushing being carried out when the receptacle 1 has not yet been fully raised to the level of the filler neck 6. In a similar way, pre-evacuation is possible via the respective control valve 42, 43 when the receptacle 1 has already been fully pressed against the filler neck 6, said pre-evacuation being carried out by connecting the interior of the receptacle 1 to a vacuum pump. It is also possible to sterilize the interior of the receptacle 1 by means of steam, provided that the device is equipped with additional control valves and ring passages.

The fact that, due to the sensor-controlled filling and emptying, the dosing chamber 2 can be constructed as a simple pressure vessel with a pressurizing gas pad covering the liquid permits, on the one hand, exact volumetric dosing and, on the other hand, the performance of the sequence of all the method steps which are normally carried out during counterpressure filling.

Figure 4:
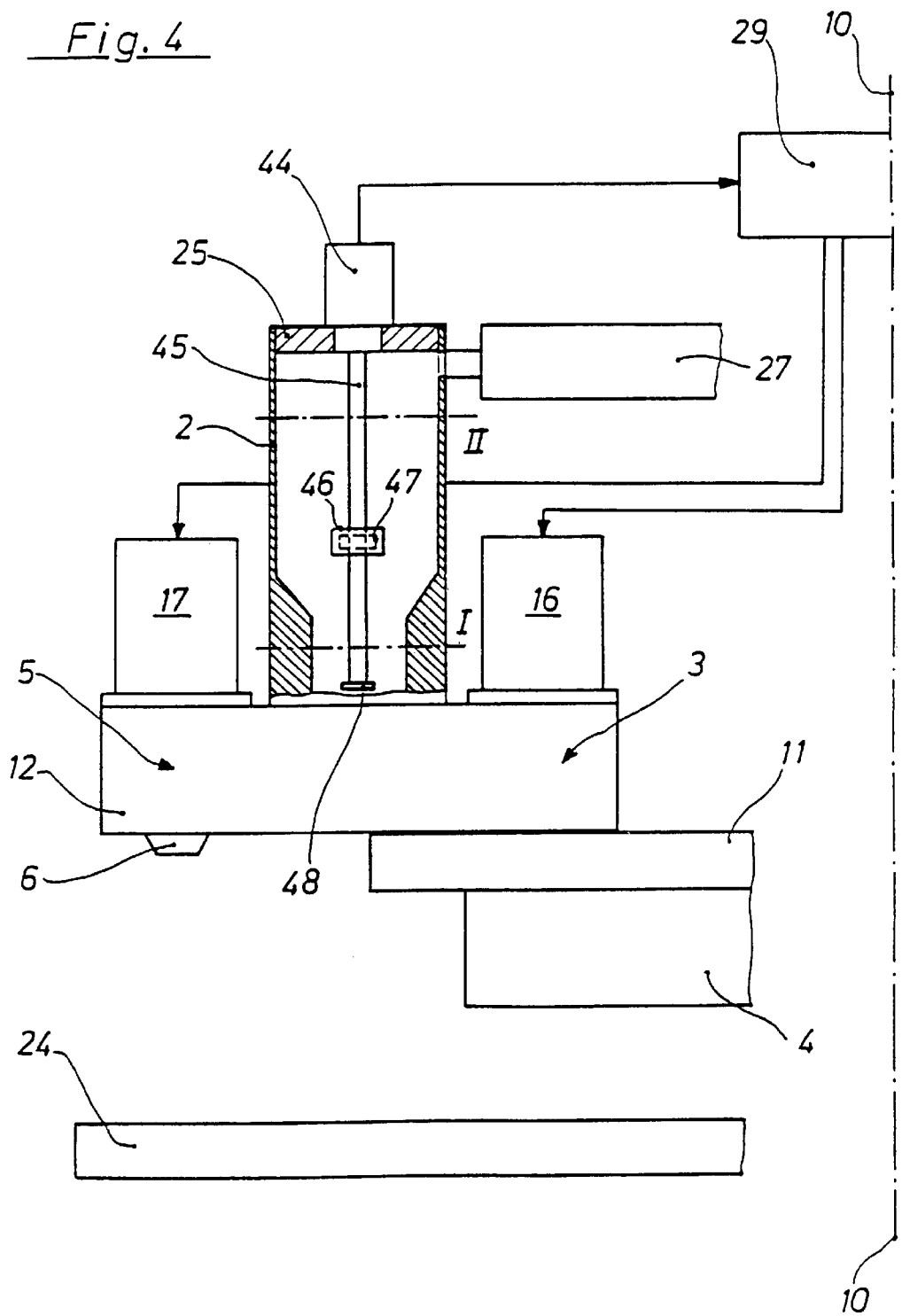
FIG. 4 is a front sectional view of another alternate embodiment of a device for bottling liquid according to the present invention.

In the case of the device according to FIG. 4, a single sensor in the form of a float-type probe 44 is secured in position in the cover 25 of the cylindrical dosing chamber 2. This float-type probe 44 is provided with a rod-shaped, e.g. inductive-type displacement gauge 45, which has a circular cross-section and which is arranged in the interior of the dosing chamber 2 concentrically with the central axis thereof. An annular float 46 is guided on said displacement gauge 45 such that it is freely movable, the lowest position of said float 46 being defined by a disk-shaped stop 48 at the lower end of said displacement gauge 45. A magnetic switching member 47, which cooperates with the displacement gauge 45, is secured in position in the interior of said float 46. The float-type probe 44 provides a measuring signal, e.g. in the form of an electric voltage, which is proportional to the position of the float 46 relative to the displacement gauge 45 and, consequently, proportional to the filling level in the dosing chamber 2.

The displacement gauge 45 of the float-type probe 44 and, consequently, the elongate measurement zone thereof is effective with regard to the entire height of the dosing chamber 2 from the cover 25 down to the discharge area at the lower end, which is reduced in cross-section. In an electronic control means 29 connected to the float-type probe 44, two switching points are defined e.g. by means of adjustable threshold value indicators, the measuring signal of the float-type probe 44 being continuously compared with said switching points. When the liquid in the dosing chamber 2 rises to an upper filling level II, a control signal will be produced, which causes closing of the inlet valve 3 via the motor operator 16. When the liquid in the dosing chamber 2 drops to a lower filling level I, another control signal will be produced, which causes closing of the outlet valve 5 by means of the motor operator 17. The height of both filling levels I and II and, consequently, the liquid volume to be bottled, can be changed steplessly and rapidly in a simple manner by adjusting the threshold value indicators. A minimum amount of liquid up to filling level I always remains in the dosing chamber 2.

Figure 5:
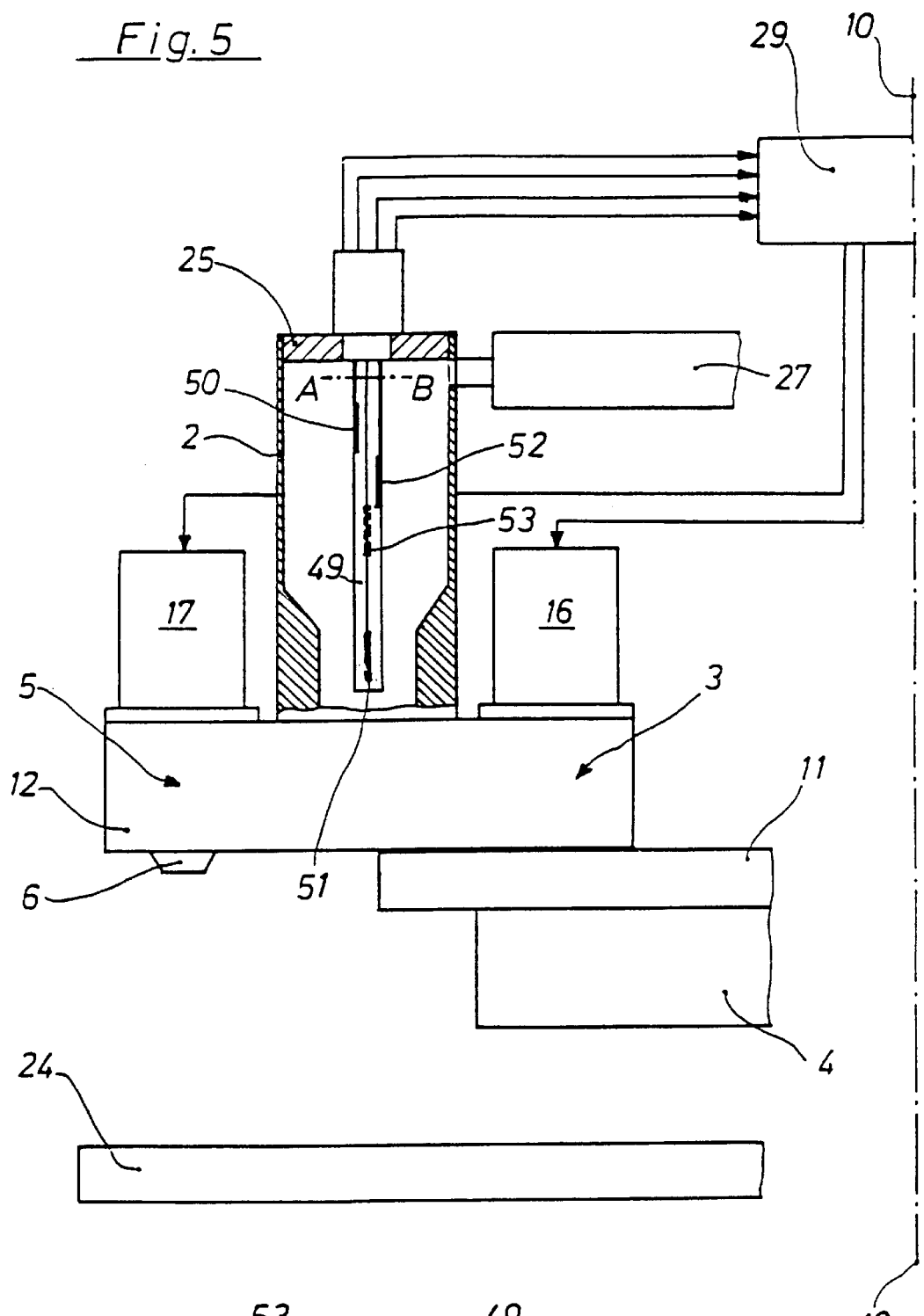
FIG. 5 is a front sectional view of another alternate embodiment of a device for bottling liquid according to the present invention.
Figure 6:
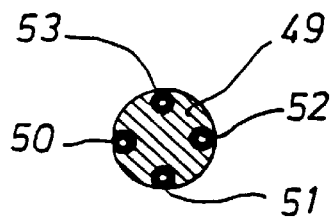
FIG. 6 is a top view of the carrier rod of the device in FIG. 5, taken along A–B of FIG. 5.

In the case of the device according to FIG. 5 and 6, a cylindrical carrier rod 49 consisting of insulating plastic material is secured in position in the cover 25 of the cylindrical dosing chamber 2, said carrier rod 49 being arranged concentrically with the central axis of the dosing chamber 2. The carrier rod 49 is provided with four parallel longitudinal grooves, which are evenly distributed over the circumference thereof and in which four sensors 50, 51, 52, 53 are secured in position. Each of said sensors essentially consists of an insulated wire of stainless steel, which is stripped along a certain length, e.g. along a length of 40 mm, at the lower end thereof. These stripped ends of the sensors 50 to 53 form elongate measurement zones, which, as can be seen in FIG. 5, are arranged on different levels and in different filling level areas, respectively, in the dosing chamber 2.

Each sensor 50 to 53 is connected via a separate line to an electronic control means 29 where the respective active sensors for controlling the inlet valve 3 and the outlet valve 5 can be chosen by means of selector switches. In addition, the exact switching point of each sensor 50 to 53 in the area of the elongate measurement zone can be set by adjustable threshold value indicators. Each sensor 50 to 53 works as an electric conductivity meter together with the dosing chamber 2, which consists of electrically conductive material and which is connected to ground, and provides a measuring signal whose characteristic is essentially proportional to the filling level in the area of the measurement zone.

Other embodiments of sensors can be realized as well. It is, for example, possible to arrange in the cover of the dosing chamber a transmitting and receiving set for electromagnetic waves, which is directed at the liquid level. When a sensor with a punctiform measuring location is used, an elongate measurement zone can be imitated by a variable delay time between the response of the sensor and the actuation of the respective control valve. Furthermore, when an appropriate measurement principle is used, it is also possible to arrange the sensor outside of the dosing chamber at a protected location.

Figure 7:
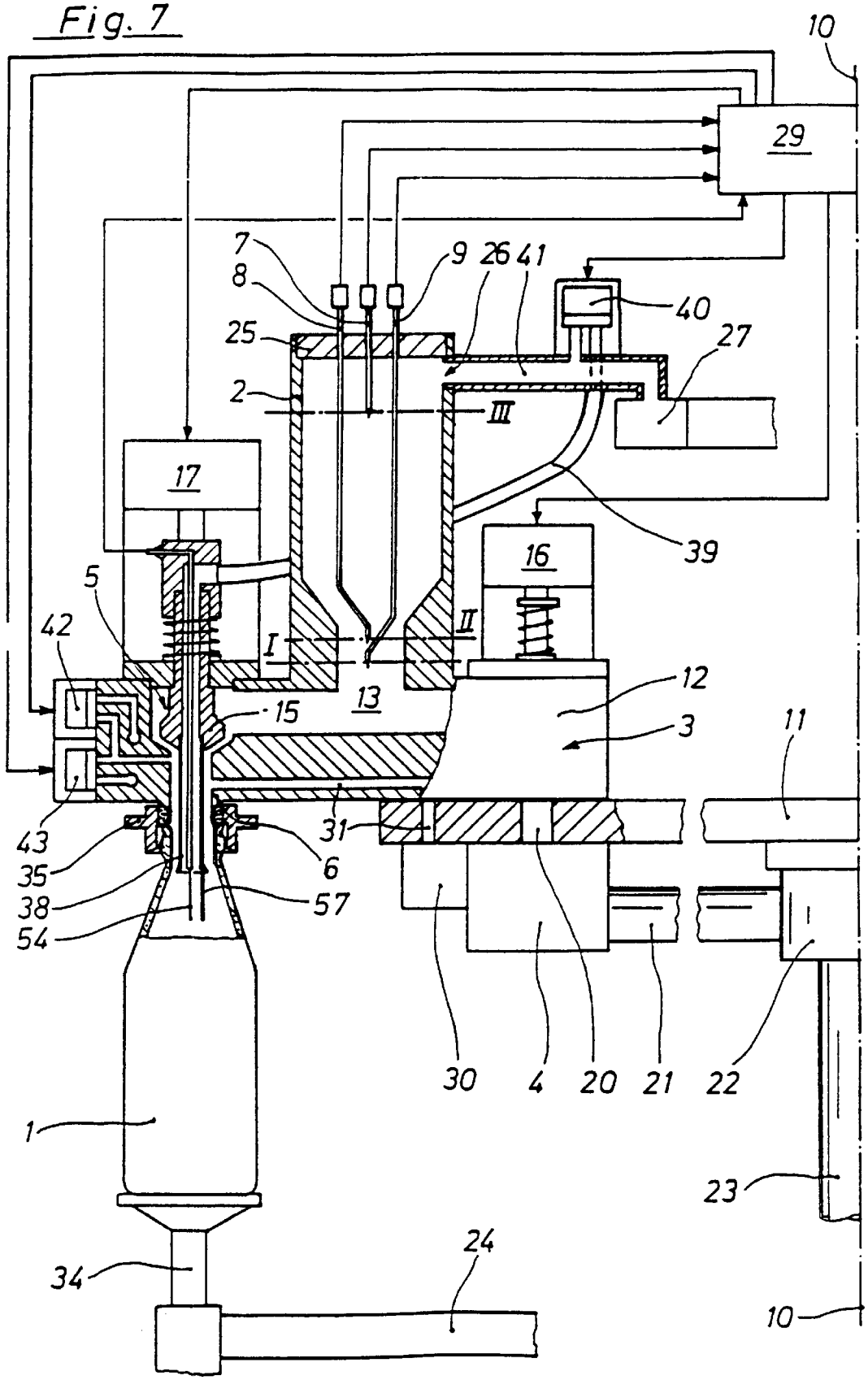
FIGS. 7–10 are front sectional views of alternate embodiments of a device for canning or bottling liquid according to the present invention.

The device for filling bottle-shaped receptacles 1 according to FIG. 7 corresponds to a large extent to the device according to FIG. 3. The device according to FIG. 7 is additionally provided with the feature that a sensor 54 in the form of a filling-level probe is arranged in the valve body 15 of the outlet valve 5 and in the tubular extension 38 of said valve body, said sensor 54 being arranged concentrically with the central axis and responding to the filling level in a receptacle 1. The filling level probe essentially consists of a wire of stainless steel which is insulated along its whole length with the exception of an area at the lower end thereof. The non-insulated area forms an elongate measurement zone, which supplies a measuring signal depending on the immersion depth in the liquid contained in the receptacle 1. A tonguelike projection 57 of the metallic extension 38 serves as a counterelectrode. At the upper end of the valve body 15, the sensor 54 extends to the outer side of said valve body 15 such that an escape of gas is prevented, and it is connected to the electronic control means 29 via an electric probe line. It follows that, when the sensor 54 is switched on, the control means 29 has supplied thereto an information on the instantaneous filling level in the receptacle 1 in the area of the elongate measurement zone.

The uppermost sensor 7 in the dosing chamber 2 determines the maximum filling level III of said dosing chamber 2. When the liquid level rises to this maximum filling level, said sensor will always switch off the inlet valve 3, independently of the further development of the filling operation. The lowermost sensor 9 in the dosing chamber 2 determines the minimum filling level I of said dosing chamber 2. Together with the uppermost sensor 7, said sensor 9 determines a maximum filling volume, which is, e.g., 505 milliliters in the case of a receptacle 1 having a nominal content of 0.5 liters. The medium sensor 8 lies at a slightly higher filling level II than the lower sensor 9 and determines together with the upper sensor 7 a minimum filling volume, which is, e.g., 495 milliliters in the case of a receptacle 1 having a nominal content of 0.5 liters. The three sensors 7, 8, 9 are directly connected to the electronic control means 29.

By means of the device described hereinbefore, a filling operation in the form of a combined volume-height filling can be carried out as follows:

The first step is the step of opening the inlet valve 3 in the closed condition of the outlet valve 5 so that liquid can flow into the dosing chamber 2 from the storage reservoir 4. As soon as the uppermost filling level in has been reached, the sensor 7 will respond and the inlet valve 3 will be closed. When the receptacle 1, which is guided by the centering bell 35, has been pressed against the filler neck 6 by the lifting mechanism 34 such that no gas can escape and when it has been pretensioned from the ring passage 27 by opening the control valve 40, the outlet valve 5 will be opened and the liquid will flow through the filler neck 6 into the receptacle 1, first at a higher velocity and then with reduced velocity due to the geodetic pressure.

The liquid will continue to flow in at any rate until the liquid level in the dosing chamber 2 has dropped to the filling level II, whereupon the medium sensor 8 will respond. If the sensor 54, which is adjusted to a medium, average filling level obtained e.g. when an ideal receptacle 1 is filled with the exact nominal content, has already responded previously, the outlet valve will now be closed immediately. Insofar, sensor 8 works with precedence relative to sensor 54.

If said sensor 54 has not yet responded when said filling level II in the dosing chamber 2 has been reached, the outlet valve 5 will remain open until said sensor 54 indicates that the desired filling level has been reached. Following this, the outlet valve 5 will be closed immediately. Such closing will, however, only be effected if the liquid level in the dosing chamber 2 is still above the lowest filling level I when said sensor 54 responds. If this is not the case, i.e. if the lower sensor 9 in the dosing chamber 2 responds first, the outlet valve 5 will be closed without the medium filling level in the receptacle 1 having been reached.

It follows that the filling device according to FIG. 7 described hereinbefore permits in an ideal manner the fulfillment of all the requirements which are to be met, e.g., when refreshing drinks are bottled in a specific type of bottles with the normal accuracy. It is guaranteed that also comparatively "small" bottles contain the necessary minimum amount of the drink in question, excessive filling of comparatively "big" bottles is prevented, and a good uniformity with regard to the filling level of the filled bottles is achieved so that unjustified complaints on the part of the consumers will be avoided and so that the filling level can be supervised with the normal checking devices within the filling system.

A combined volume-height filling is also possible by means of only one sensor 8 or 9 in the lower area of the dosing chamber 2. As has been described hereinbefore, the sensors can be switched such that they work with precedence relative to the sensor 54 for the filling level in the receptacle 1. It is also possible to adjust one sensor in said dosing chamber 2 precisely to the nominal volume.

Furthermore, the sensor 54 for the filling level in the receptacle 1 can be switched such that it works with precedence relative to the sensor or the sensors in the dosing chamber 2, e.g. when a certain minimum amount of free space is desired in the head of the receptacle 1 so that the beverages can expand or so that the risk of rupture can be reduced when beverages containing $CO_2$ are bottled.

In addition, the device according to FIG. 7 can also be operated as a pure volume filler by simply switching off the sensor 54.

Operation as a pure height filler is possible as well. For this purpose, the volume between the upper sensor 7 and the lower sensor 9 in the dosing chamber 2 is adjusted to a value which exceeds the maximum filling volume. The flow of liquid into the receptacle 1 will then be finished in any case by the sensor 54 in the receptacle 1; said sensor 54 provides in addition the possibility of arbitrarily varying the filling height in the area of the elongate measurement zone. The lower sensor 9 in the dosing chamber 2 is here used as a pure safety means preventing complete emptying of the dosing chamber 2, e.g., in the case of rupture of a receptacle 1. The advantage which such a height filler shows in comparison with known height fillers, where the filler neck 6 is fed directly from the storage reservoir 4, is to be seen in the fact that, due to the defined height conditions in the dosing chamber 2, an exactly reproducable adjustment of the filling rate with automatic reduction towards the end of the filling operation can be achieved. This has the effect that even beverages which are difficult to handle can be bottled accurately and with little bubble formation.

Figure 8:
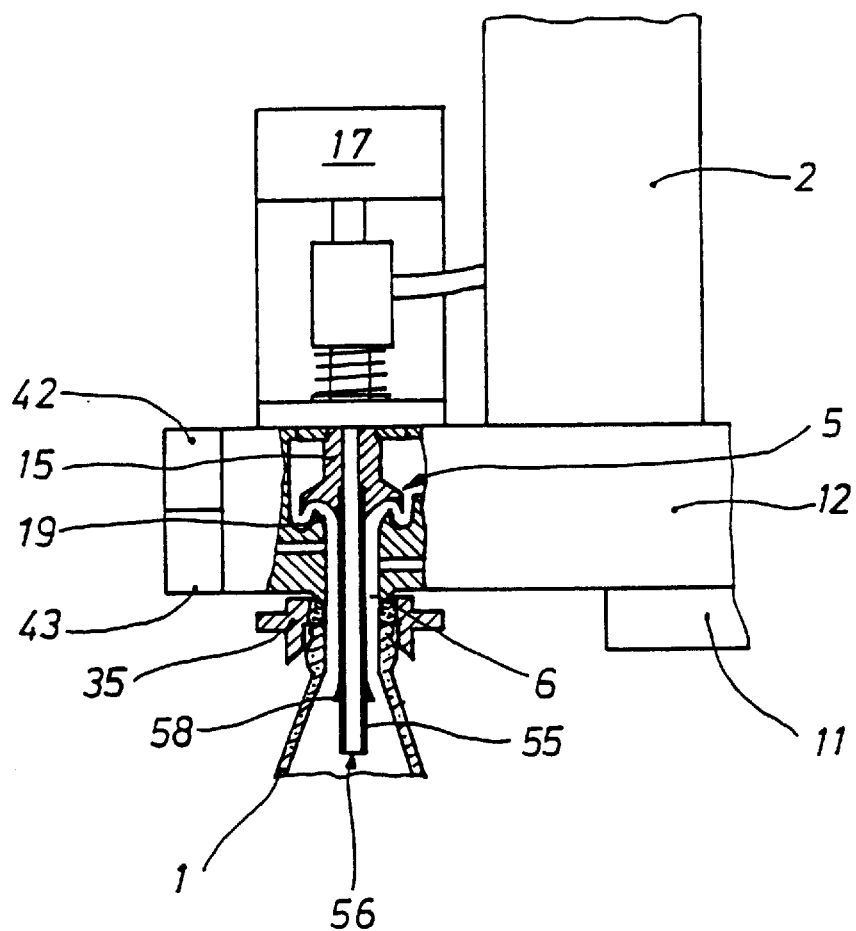

The device according to FIG. 8, where only part of said device is shown, again corresponds to the device according to FIG. 3 to a large extent. The valve body 15 of the outlet valve 5 has, however, connected thereto a reflux gas tube 55 instead of an extension, said reflux gas tube 55 being replaceable. The reflux gas tube 55 is provided with a rejector screen 58 for the liquid flowing in and, at the lower end thereof, with an axial chamfer 56 defining the maximum filling height. When the liquid in the receptacle 1 has risen up to said lower end 56, pressurizing gas can no longer escape from the receptacle 1 and the flow of liquid into the receptacle 1 will be stopped automatically. In order to prevent an uncontrolled flow after the end of the filling operation, a conventional siphon is formed between the valve body 15 and its valve seat 19 in the valve block 12, said siphon preventing the pressurizing gas from escaping from the receptacle 1 at the top.

The means formed by the reflux gas tube 55 and responding to the filling level in the receptacle 1 is combined, e.g., with a lower sensor defining a specific filling volume in the dosing chamber 2. The reflux gas tube 55, which works with precedence, prevents excessive filling of the receptacle 1 and guarantees a sufficiently large free head space.

Also the above-described device according to FIG. 8 permits pure height filling; the filling height can, in this case, be varied by exchanging the reflux gas tube 55. An alternative possibility is again pure volume filling, the reflux gas tube 55 being in this case "eliminated" by complete removal or by exchange for an adequately short reflux gas tube which ends directly below the rejector screen 58.

Figure 9:
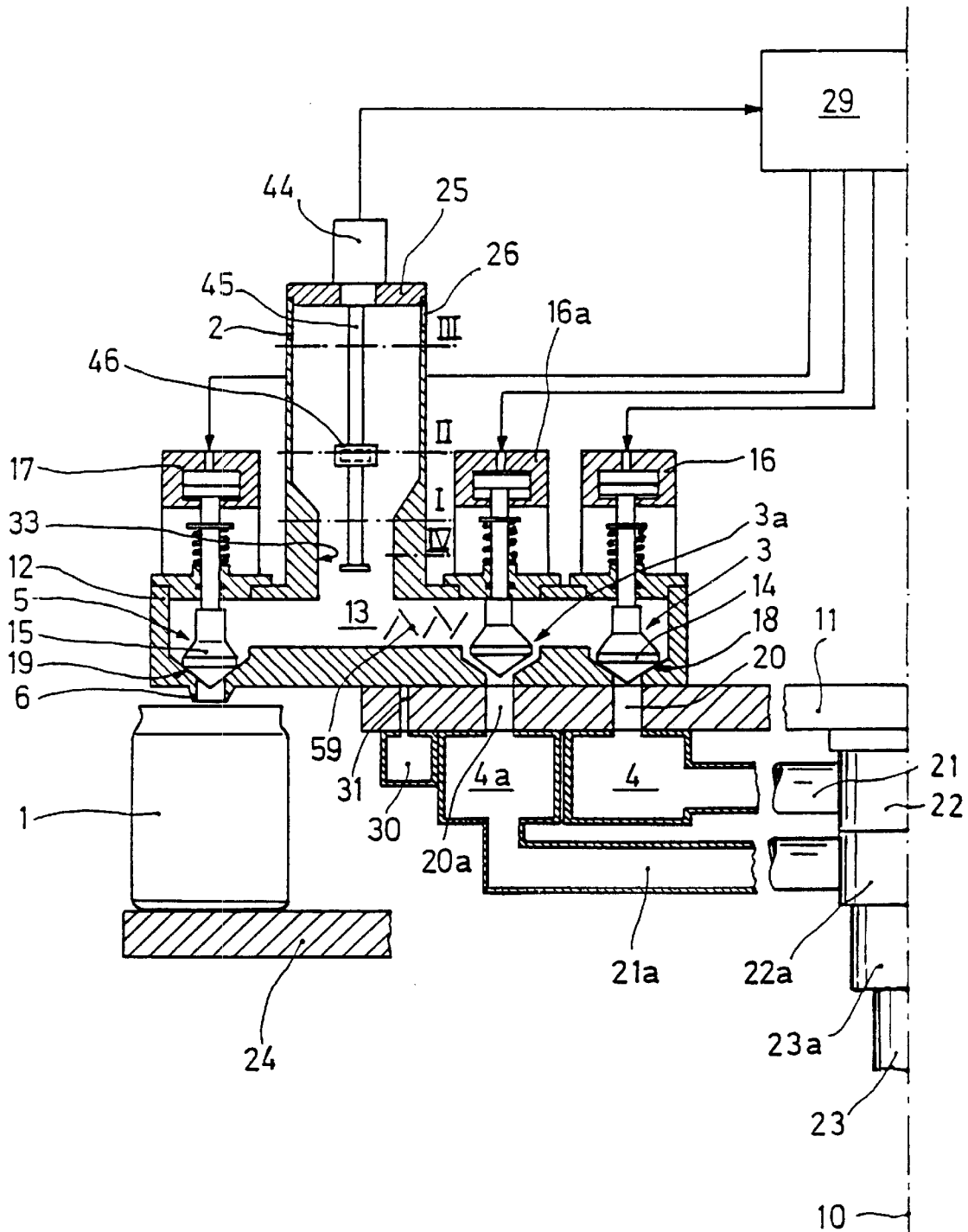

The device according to FIG. 9 largely corresponds to the device according to FIG. 1 as far as its basic structural design is concerned, and, as far as the structural design of the sensor 44 in the dosing chamber 2 is concerned, it corresponds completely to the embodiment according to FIG. 4. Hence, only deviating features and additional features will be described hereinbelow.

The valve block 12 including its cavity 13 is extended at the side facing the axis of rotation 10. In the space thus obtained, an additional motor operator 16a is secured to the upper surface of the valve block 12, whereas the lower surface thereof has formed therein an additional inlet in the form of a passage 20a. The motor operator 16a actuates an additional inlet valve 3a, which has the same structural design as the inlet valve 3 and which is adapted to be used for selectively closing or opening said additional passage 20a leading into the cavity 13 just as passage 20.

The additional passage 20a is connected to an additional annular storage reservoir 4a which has the liquid or component to be bottled supplied thereto via a plurality of radial lines 21a, a rotary distributor 22a arranged concentrically with the axis of rotation 10, and a riser 23a. The liquid is supplied e.g. via a pump (not shown), or via a preceding tank (not shown) which is arranged on a higher level than the dosing chamber 2. Furthermore, a static mixer 59 is secured in position in the area between the locations where the additional passage 20a and the dosing chamber 2 open into the cavity 13.

If the storage reservoir 4 contains a ready-mixed beverage or other product, the filling operation can take place in the manner which has already been described with reference to FIG. 1. In the course of this filling operation, the control means 29 controls, by means of the inlet valve 3, the filling of the dosing chamber 2 from the storage reservoir 4 up to the upper filling level III, and, by means of the outlet valve 5, the emptying of the dosing chamber 2 down to the lower filling level I and thus simultaneously the filling of the can 1. If also the additional storage reservoir 4a contains a ready-mixed product, said ready-mixed product can selectively be canned in portions in a corresponding manner, the filling of the dosing chamber 2 being controlled by the additional inlet valve 3a while the inlet valve 3 is constantly closed.

In addition, the device according to FIG. 9 can be used for preparing and canning a product consisting of two different components. For this purpose, a first component, e.g. water, is introduced in the storage reservoir 4, and a second component, e.g. syrup, is introduced in the additional storage reservoir 4a. In cases in which an amount of liquid up to the lower level I should remain in the device between two filling operations, i.e. if complete emptying of the device is to be prevented, the ready-mixed product will have to be introduced up to said level I prior to the first filling operation. This can be done manually or automatically with the aid of the control means 29. For this purpose, water will first be introduced up to height IV by opening the inlet valve 3, whereupon syrup will be introduced up to the filling level I by opening the additional inlet valve 3a in the closed condition of the inlet valve 3. Alternatively, it is also possible to prepare an excessively large first charge by appropriate additional switching points of the sensor 44, the volume of the cavity 13 being taken into account in the case of said excessively large first charge. After these preparatory steps, the actual mixing and filling can be started.

For this purpose, syrup is first supplied by opening the additional inlet valve 3a until the medium level II has been reached in the dosing chamber 2. The end of this phase is shown in FIG. 9. Subsequently, the additional inlet valve 3a is closed and inlet valve 3 is opened. Water will now be added until the upper level III has been reached in the dosing chamber 2. In the course of this step, the water flowing in will pass through the syrup, the mixing process being supported by the mixing caused by the static mixer 59 and the reduction of cross-sectional area between the cavity 13 and the dosing chamber 2. Subsequently, the inlet valve 3 will be closed again. The outlet valve 5 will now be opened, and the ready-mixed beverage will flow through the filler neck 6 into the can 1 until the filling level in the dosing chamber 2 has dropped to the lower level I. Following this, the outlet valve 5 will be closed immediately. An amount of the ready-mixed beverage corresponding to the volume between filling level I and filling level III is now contained in the can 1. This can 1 will be removed and new filling cycle will be started by opening the inlet valve 3*a* and by supplying an empty can 1. The filling levels I to IV in the dosing chamber 2 are detected by the sensor 44 provided with the float 46 and transmitted to the control means 29.

If necessary, additional storage reservoirs 4*b* etc. with associated inlet valves 3*b* etc. can be provided, depending on the number of components to be mixed.

If particularly viscous or pulpy components are to be processed, these components may also be introduced directly into the dosing chamber 2, if necessary with the aid of a driven dosing piston.

Instead of the short filler neck for canning under atmospheric pressure shown in FIG. 9, it is also possible to use other filler necks of the type shown, e.g., in FIGS. 2, 3, 7 and 8. If necessary, this will also permit canning under counterpressure. It is also possible to use other sensors for the dosing chamber 2, said sensors being shown e.g. in FIGS. 1, 5 and 6.

Figure 10:
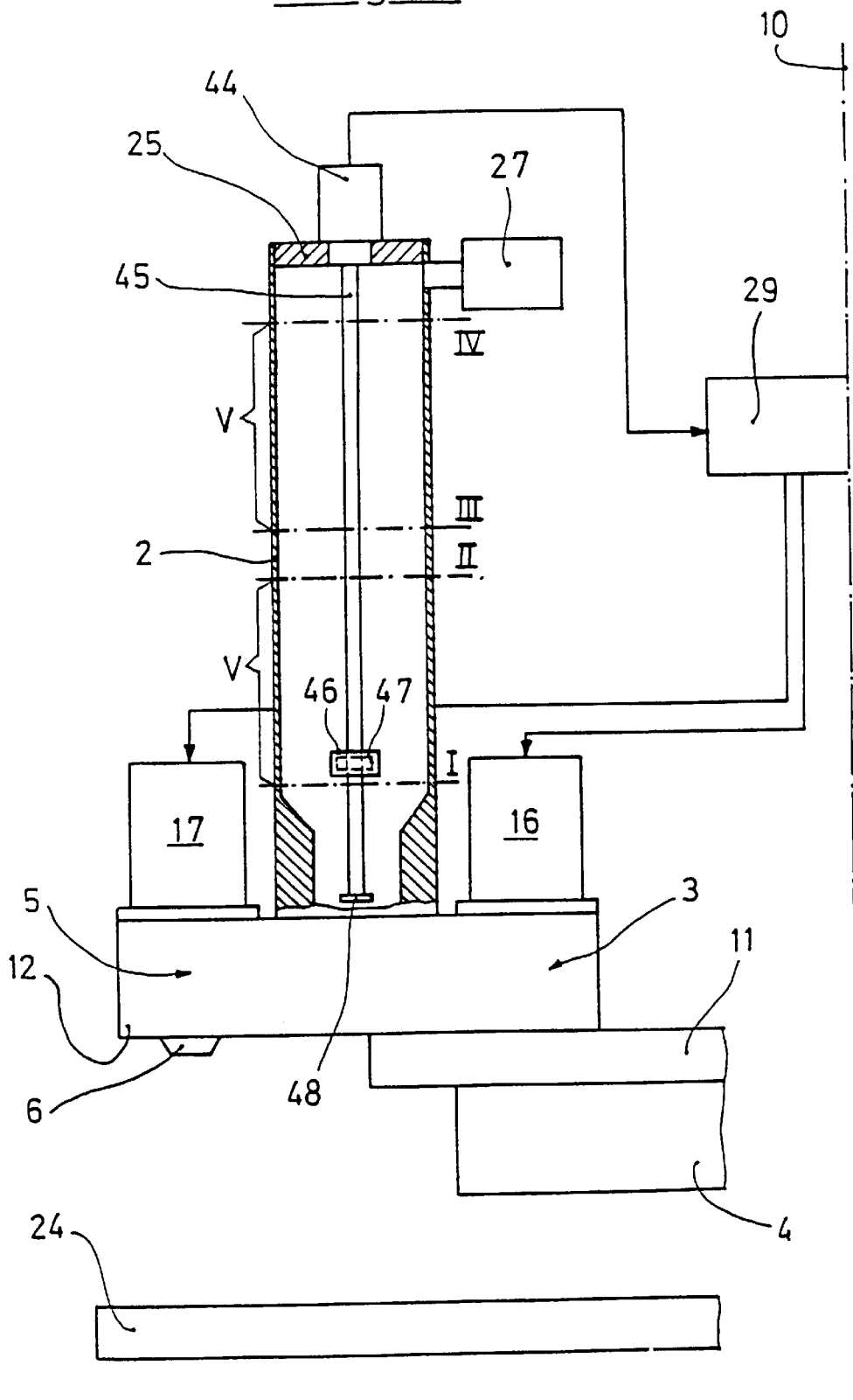

In the device according to FIG. 10, a single sensor in the form of a float-type probe 44 is again secured in position in the cover 25 of the cylindrical dosing chamber 2. This float-type probe 44 is provided with a rod-shaped, e.g. inductive-type displacement gauge 45, which has a circular cross-section and which is arranged in the interior of the dosing chamber 2 concentrically with the central axis thereof. An annular float 46 is guided on said displacement gauge 45 such that it is freely movable, the lowest position of said float 46 being defined by a disk-shaped stop 48 at the lower end of said displacement gauge 45. A magnetic switching member 47, which cooperates with the displacement gauge 45, is secured in position in the interior of said float 46. The float-type probe 44 provides a measuring signal, e.g. in the form of an electric voltage, which is proportional to the position of the float 46 relative to the displacement gauge 45 and, consequently, proportional to the filling level in the dosing chamber 2.

In comparison with the height which would be necessary for a volume V of, e.g., 0.5 liters to be canned or bottled, the dosing chamber 2 is provided with an enormous extension at the top so that its total volume amounts to more than one liter.

Accordingly, the ratio of the height to the diameter of the dosing chamber 2 is more than 3:1, and also ratios of 5:1 and more are easily possible. The magnitude of the volume V to be canned or bottled and the height position of said volume V in the dosing chamber 2 are determined by the float-type probe 44 and the electronic control means 29 connected thereto, which knows the filling level in the dosing chamber 2 at any time. In FIG. 10, two variants are shown: when delicate liquids or liquids which tend to foam heavily are to be canned or bottled, the volume V to be canned or bottled is placed in the lower area of the dosing chamber 2 and defined by the two filling levels I and II. When insusceptible liquids which are easy to handle are to be canned or bottled, the volume V to be canned or bottled is placed in the upper area of the dosing chamber 2 and defined by the two filling levels III and IV. The filling levels I to IV are, in turn, represented by corresponding switching points of the float-type probe 44, said switching points being stored in the control means 29, e.g., in the form of voltage values. The two associated filling levels for the minimum and the maximum filling level can be adjusted along the entire height of the dosing chamber 2 by a single control element while maintaining their mutual distance, said control element being, e.g., a potentiometer (not shown) on the control means 29. The height position of the volume V to be canned or bottled and, consequently, the discharge speed of the liquid from the filler neck 6 can thus be adjusted easily and rapidly.

The function of the above-described device which is brought about by the control means 29 is independent of the height position of the volume V to be canned or bottled: at the beginning of a filling operation, the inlet valve 3 is opened by actuating the motor operator 16 and the liquid flows from the storage reservoir 4 into the dosing chamber 2 from below. As soon as the adjusted upper filling level II or IV has been reached, the inlet valve 3 is closed by the motor operator 16. When a vessel to be filled has been placed below the filler neck 6 and on the rotary table 24, respectively, the outlet valve 5 is opened by the motor operator 17 and the liquid flows from the dosing chamber 2 through the filler neck 6 into said vessel. The discharge speed occurring during this step, depends on the respective filling level in the dosing chamber 2. As soon as the respectively adjusted lower filling level I or III has been reached, the outlet valve 5 is closed by the motor operator 17 and the filling operation is finished. A certain amount of liquid will remain in the dosing chamber 2 in any case so that constant flow conditions are guaranteed.

I claim:

1. A device for filling liquids in portions into receptacles comprising a plurality of volumetric dosing chambers, which are arranged on the circumference of a rotor rotating about a vertical axis of rotation and each of which is connected to a storage reservoir and to a filler neck, the device further comprising:

controllable inlet valves provided between each of the dosing chambers and the storage reservoir, controllable outlet valves provided between each of the dosing chambers and the filler neck, sensor means provided with each of the dosing chambers responding to the filling level of the respective dosing chamber without limiting the volume of the dosing chamber, each of said sensor means communicating with a control means for controlling the closing of said inlet and outlet valves and each of said sensor means comprising at least one sensor, said sensor means being adapted to signal said control means to close the respective inlet valve when the filling level in the respective dosing chamber rises to a specific first height, and said sensor means being further adapted to signal said control means to close the respective outlet valve when the filling level in the dosing chamber drops to a specific second height.

2. A device according to claim 1, wherein said at least one sensor comprises a rod-type probe and said rod-type probe is arranged in the interior of the dosing chamber.

3. A device according to claim 1 or 2 wherein the sensor means comprises an electric conductivity meter.

4. A device according to claim 1 or 2, wherein said sensor means is arranged such that it can be adjusted, for the purpose of adaptation to different filling levels.

5. A device according to claim 1 or 2 wherein said sensor means has several measuring points for different filling levels.

6. A device according to claim 1 wherein said sensor means comprises at least two sensors which respond to different filling levels, a sensor arranged on a higher level closing the inlet valve when the filling level has risen to a specific first height, and a sensor arranged on a lower level closing the outlet valve when the filling level has dropped to a specific second height.

7. A device according to claim 1 or 2, wherein each of said at least one sensor has a measuring point and, when the dosing chamber is arranged vertically, the measuring point of each of said at least one sensor is positioned at a lower level than the maximum possible filling level in said dosing chamber.

8. A device according to claim 1 or 2, wherein said dosing chamber is provided with a reduction of cross-sectional area in the area of the measuring point of a sensor.

9. A device according to claim 1 or 2, wherein a sensor constructed as a rod-type probe is bent in such a way that its measuring point is located on the central axis of said dosing chamber.

10. A device according to claim 2, wherein each of said at least one sensor is arranged in a releasable cover of the dosing chamber.

11. A device according to claim 1, wherein each of said dosing chambers has an opening above the highest measuring point of each of said at least one sensor.

12. A device according to claim 11, wherein the opening is connected to a ring passage.

13. A device according to claim 12, wherein the ring passage is adapted to be connected to a CIP system.

14. A device according to claim 12, wherein the ring passage is connected to a voltage source.

15. A device according to claim 1 further including a valve block, which includes a cavity and on the upper side of which the dosing chamber with the said sensor means is arranged, said dosing chamber opening into said cavity.

16. A device according to claim 15, wherein on the upper side of the valve block the motor operators for the valve bodies of the inlet valve and of the outlet valve are arranged, and wherein on the bottom side of the valve block there are provided the filler neck and an inlet opening for the liquid, said filler neck and said inlet opening being formed on different sides of the dosing chamber.

17. A device according to claim 1, wherein a valve body, which forms part of the outlet valve and which is provided with a longitudinal hole, has at a lower end thereof a tubular extension projecting into an interior of a receptacle to be filled.

18. A device according to claim 17, wherein the extension is adapted to be connected to the dosing chamber via the longitudinal hole and a line connected to said hole.

19. A device according to claim 18, wherein the connection between the extension and the dosing chamber is adapted to be controlled via a control valve.

20. A device according to claim 15 or 17, wherein the valve block has arranged thereon at least one additional control valve by means of which the filler neck can be connected to the atmosphere and/or to a source of flush gas and/or to a vacuum source and/or to a flushing passage.

21. A device according to claim 1, wherein the sensor means comprises at least one sensor with at least one elongate measurement zone and produces a measuring signal depending on the filling level in the area of said measurement zone.

22. A device according to claim 21, wherein the elongate measurement zone is essentially effective with regard to the entire height of the dosing chamber.

23. A device according to claim 22, wherein one sensor controls the inlet valve as well as the outlet valve.

24. A device according to claim 21, wherein the elongate measurement zone is only effective with regard to a subarea of the height of the dosing chamber, and wherein there are provided several sensors having elongate measurement zones which are arranged on different levels.

25. A device according to claim 24, wherein at least one of the sensors controls the inlet valve and wherein at least one other sensor controls the outlet valve.

26. A device according to claim 21, wherein the sensor is a float-type probe.

27. A device according to claim 26, wherein the sensor comprises a rod-shaped displacement gauge and a float which is guided on said displacement gauge such that it is freely movable.

28. A device according to claim 27, wherein the rod-shaped displacement gauge is arranged concentrically with the central axis of the dosing chamber.

29. A device according to claim 27 or 28, wherein a switching member for the displacement gauge is secured to the float.

30. A device according to claim 21, wherein several wirelike sensors are arranged on a common carrier rod parallel to the central axis thereof, said sensors being distributed over the circumference of said carrier rod.

31. A device according to claim 30, wherein the carrier rod is arranged concentrically with the central axis of the dosing chamber.

32. A device according to claim 1 or 2, wherein the volume of the dosing chamber is essentially larger than the volume of one portion of the liquid to be canned or bottled.

33. A device according to claim 32, wherein the height of the dosing chamber is essentially higher than the height required for the volume of one portion of the liquid to be canned or bottled.

34. A device according to claim 32, wherein the volume of the dosing chamber is at least twice as large as the volume of one portion of the liquid to be canned or bottled.

35. A device according to claim 32, wherein the sensor means comprises at least two sensors, each of said sensors having a measuring point, and wherein the measuring points of the sensors are vertically spaced from one another and the sensors are adapted to be vertically adjusted in common relative to the dosing chamber, the vertical distance between said measuring points defining the volume of one portion of the liquid to be canned or bottled.

36. A device according to claim 1 or 2, wherein the ratio of height to diameter of the dosing chamber is at least 3:1.

37. A device according to claim 1 or 2, wherein at least one additional storage reservoir for a liquid is provided, each of the dosing chambers being adapted to be connected to said additional storage reservoir.

38. A device according to claim 37, wherein each dosing chamber is connected to a plurality of storage reservoirs for different liquids via several controllable inlet valves.

39. A device according to claim 38, wherein at least part of the inlet valves are adapted to be controlled by the control means in communication with the sensor means of the dosing chamber.

40. A device according to claim 39, wherein the sensor means of the dosing chamber signals the associated control means to close a first inlet valve when the filling level in the dosing chamber rises to a specific first height and to close a second inlet valve when the filling level in the dosing chamber rises to a specific second height.

41. A device according to claim 34, further including a valve block which includes a cavity, a filler neck, the dosing chamber and several openings, which are each connected to a separate storage reservoir leading into said cavity.

42. A device according to claim 41, wherein a mixing member is arranged in the cavity between the dosing chamber and the openings.

43. A device according to claim 34, wherein at least one of the inlet valves has associated therewith a dosing piston.

44. A device according to claim 1 or 2, wherein the filler neck has associated therewith a means responding to the filling level in a receptacle to be filled.

45. A device according to claim 44, wherein said means includes a reflux gas tube with a lower end, said reflux gas tube being adapted to be introduced in the receptacle to be filled.

46. A device according to claim 44, wherein said means includes a reflux gas line with a float valve, said reflux gas line being adapted to be connected to the receptacle to be filled.

47. A device according to claim 44, wherein said means includes at least one sensor responding to the filling level in a receptacle to be filled.

48. A device according to claim 47, wherein the sensor is a filling-level probe which is adapted to be introduced in a receptacle to be filled.

49. A device according to claim 47, wherein the sensor is provided with an elongate measurement zone and produces a measuring signal which depends on the filling level in the area of said measurement zone.

50. A device according to claim 44, wherein said means is capable of terminating the filling operation when a predetermined filling level has been reached in a receptacle to be filled.

51. A device according to claim 50, wherein the filling operation is exclusively terminated by said means.

52. A device according to claim 50, wherein said means terminates the filling operation in cooperation with at least one sensor of the dosing chamber.

53. A device according to claim 52, wherein said means is connected such that a sensor of the dosing chamber works with precedence relative thereto.

54. A device according to claim 52, wherein said means is connected such that it works with precedence relative to a sensor of the dosing chamber.

55. A device according to claim 44, wherein the dosing chamber has associated therewith a sensor defining, in cooperation with a sensor arranged on a higher level, a minimum filling volume.

56. A device according to the claim 44, wherein the dosing chamber has associated therewith a sensor defining, in cooperation with a sensor arranged on a higher level, a maximum filling volume.

57. A device according to claim 52, wherein claim said means will terminate the filling operation when a predetermined filling level has been reached, unless the outlet valve has been closed previously after a specific filling volume has flown into the receptacle to be filled.

58. A device according to claim 52, wherein said means will terminate the filling operation when a predetermined filling level has been reached, provided that a predetermined filling volume has previously flown into the receptacle to be filled.

59. A device according to claim 44, wherein said means is adapted to be switched off.

60. A device according to claim 1 or 2, wherein each filler neck has associated therewith at least two dosing chambers having each a separate inlet valve, a separate outlet valve and a separate sensor means.

* * * * *